(12) United States Patent
Uchijima et al.

(10) Patent No.: US 10,798,670 B2
(45) Date of Patent: Oct. 6, 2020

(54) INFORMATION PROCESSING DEVICE, PORTABLE DEVICE, AND SYSTEM

(71) Applicant: unerry Inc., Tokyo (JP)

(72) Inventors: Norihito Uchijima, Tokyo (JP); Hidetoshi Uchiyama, Tokyo (JP)

(73) Assignee: UNERRY INC., Tokyo (JP)

( * ) Notice: Subject to any disclaimer, the term of this patent is extended or adjusted under 35 U.S.C. 154(b) by 0 days.

(21) Appl. No.: 16/079,374

(22) PCT Filed: Feb. 22, 2017

(86) PCT No.: PCT/JP2017/006636
§ 371 (c)(1),
(2) Date: Aug. 23, 2018

(87) PCT Pub. No.: WO2017/150309
PCT Pub. Date: Sep. 8, 2017

(65) Prior Publication Data
US 2019/0028995 A1 Jan. 24, 2019

(30) Foreign Application Priority Data

Feb. 29, 2016 (JP) .................................. 2016-037323

(51) Int. Cl.
*H04W 24/00* (2009.01)
*H04W 64/00* (2009.01)
(Continued)

(52) U.S. Cl.
CPC ............ *H04W 64/003* (2013.01); *G01S 5/02* (2013.01); *H04W 4/021* (2013.01); *H04W 4/023* (2013.01);
(Continued)

(58) Field of Classification Search
CPC ......... H04W 4/02; H04W 4/14; H04W 48/04; H04W 64/00
(Continued)

(56) References Cited

U.S. PATENT DOCUMENTS

2009/0005014 A1\* 1/2009 Vernick ............... H04M 3/5231
455/414.1
2010/0019969 A1 1/2010 Zhou
(Continued)

FOREIGN PATENT DOCUMENTS

| JP | 2010-159980 | 7/2010 |
| JP | 2010-524336 | 7/2010 |

(Continued)

OTHER PUBLICATIONS

Written Opinion of the International Searching Authority dated May 16, 2017 in corresponding International Patent Application No. PCT/JP2017/006636 (4 pp.).
(Continued)

*Primary Examiner* — Matthew W Genack
(74) *Attorney, Agent, or Firm* — Staas & Halsey LLP

(57) ABSTRACT

An information processing device includes a processor configured to: receive first positional information related to a position of a portable device from the portable device; extract transmitters located within a certain area including a first positional coordinate, which is a positional coordinate of the portable device based on the first positional information, from among registered transmitters, calculate respective distances between transmitters within the certain area and the portable device, and extract a predetermined number or less of transmitters based on the calculated distances from among the transmitters within the certain area; and transmit first identification information of the predetermined number or less of transmitters, which allows the portable device to
(Continued)

determine whether the first identification information includes second identification information indicating a transmitter transmitted from the transmitter in and to perform a particular process when the first identification information includes the second identification information, to the portable device.

13 Claims, 10 Drawing Sheets

(51) Int. Cl.
　　*G01S 5/02*　　　(2010.01)
　　*H04W 4/029*　　(2018.01)
　　*H04W 4/021*　　(2018.01)
　　*H04W 4/02*　　 (2018.01)
　　*H04W 48/16*　　(2009.01)
　　*H04W 4/18*　　 (2009.01)
　　*H04W 4/80*　　 (2018.01)

(52) U.S. Cl.
　　CPC .......... *H04W 4/029* (2018.02); *H04W 48/16* (2013.01); *H04W 64/00* (2013.01); *H04W 4/18* (2013.01); *H04W 4/80* (2018.02)

(58) Field of Classification Search
　　USPC .......................... 455/456.1–456.6, 457, 466
　　See application file for complete search history.

(56) References Cited

U.S. PATENT DOCUMENTS

| | | | |
|---|---|---|---|
| 2012/0317229 A1 | 12/2012 | Shimakawa | |
| 2013/0166341 A1* | 6/2013 | Fullington | G06Q 10/06 705/7.14 |
| 2013/0262198 A1* | 10/2013 | Chung | G06Q 30/0226 705/14.1 |
| 2013/0342710 A1* | 12/2013 | Kanma | H04W 48/16 348/207.1 |
| 2015/0304863 A1* | 10/2015 | Gupta | H04W 24/10 455/423 |
| 2016/0345173 A1 | 11/2016 | Shirakawa et al. | |

FOREIGN PATENT DOCUMENTS

| | | |
|---|---|---|
| JP | 2012-8717 | 1/2012 |
| JP | 2013-3661 | 1/2013 |
| JP | 2015-148896 | 8/2015 |
| JP | 2015-162069 | 9/2015 |
| JP | 2016-14997 | 1/2016 |
| WO | 2008/059882 A1 | 5/2008 |

OTHER PUBLICATIONS

Japanese Platform for Patent Information English abstract for Japanese Patent Publication No. 2015-162069, published Sep. 7, 2015.
Japanese Platform for Patent Information English abstract for Japanese Patent Publication No. 2012-8717, published Jan. 1, 2012.
Japanese Platform for Patent Information English abstract for Japanese Patent Publication No. 2010-159980, published Jul. 22, 2010.
Japanese Platform for Patent Information English abstract for Japanese Patent Publication No. 2013-3661, published Jan. 7, 2013.
Japanese Platform for Patent Information English abstract for Japanese Patent Publication No. 2015-148896, published Aug. 20, 2015.
Patentscope English abstract for International Publication No. 2008/059882 A1, published May 22, 2008.
Japanese Platform for Patent Information English abstract for Japanese Patent Publication No. 2016-14997, published Jan. 28, 2016.
Japanese Office Action dated Jun. 7, 2016 in corresponding Japanese Patent Application No. 2016-037323, pp. 7.
International Search Report dated May 16, 2017 in corresponding International Patent Application No. PCT/JP2017/006636, pp. 4.
Written Opinion of the International Searching Authority dated May 16, 2017 in corresponding International Patent Application No. PCT/JP2017/006636, pp. 4.

* cited by examiner

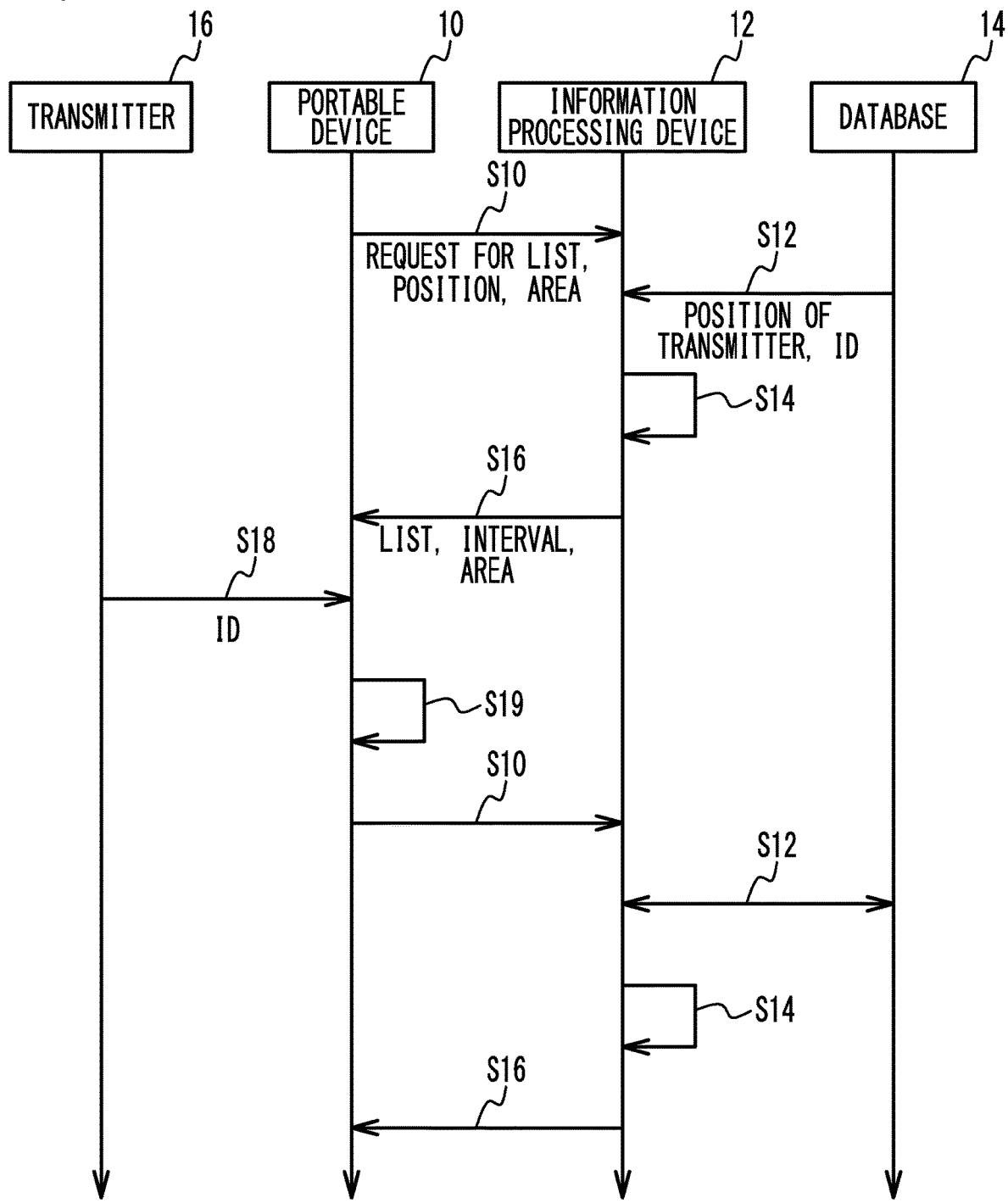

FIG. 9A

| ID | X COORDINATE | Y COORDINATE |
|---|---|---|
| B1 | X1 | Y1 |
| B2 | X2 | Y2 |
| B3 | X3 | Y3 |
| B4 | X4 | Y4 |
| B5 | X5 | Y5 |
| B6 | X6 | Y6 |
| B7 | X7 | Y7 |
| B8 | X8 | Y8 |
| ⋮ | ⋮ | ⋮ |

FIG. 9B

| ID | X COORDINATE | Y COORDINATE |
|---|---|---|
| B2 | X2 | Y2 |
| B3 | X3 | Y3 |
| B4 | X4 | Y4 |
| B5 | X5 | Y5 |

FIG. 9C

| ID | DISTANCE |
|---|---|
| B4 | L4 |
| B5 | L5 |
| B3 | L3 |
| B2 | L2 |

FIG. 9D

| ID |
|---|
| B4 |
| B5 |
| B3 |

INFORMATION PROCESSING DEVICE, PORTABLE DEVICE, AND SYSTEM

CROSS-REFERENCE TO RELATED APPLICATIONS

This application is a U.S. National Stage Application, which claims the benefit under 35 U.S.C. § 371 of International Patent Application No. PCT/JP2017/006636 filed on Feb. 22, 2017, which claims the foreign priority benefit under 35 U.S.C. § 119 of Japanese Patent Application No. 2016-037323, filed Feb. 29, 2016, the contents of which are incorporated herein by reference.

TECHNICAL FIELD

The present invention relates to an information processing device, a portable device, and a system.

BACKGROUND ART

There has been known a system performing a particular process when a portable device such as a smartphone receives transmitter information from a particular transmitter. For example, in iBeacon (registered trademark), when a portable device receives beacon information of a particular beacon transmitter, the portable device performs a particular process. For example, the portable device transmits the beacon information to a server. The server transmits the positional information of the particular beacon transmitter to the portable device.

Patent Document 1 describes that beacon information received by a portable device is transmitted to a server and the validity of the portable device is authenticated based on the beacon information and the identification information of the portable device. Patent Documents 2 and 3 describe that a portable device transmits positional information to a server.

PRIOR ART DOCUMENT

Patent Document

[Patent Document 1] Japanese Patent Application Publication No. 2015-162069
[Patent Document 2] Japanese Patent Application Publication No. 2012-8717
[Patent Document 3] Japanese Patent Application Publication No. 2010-524336

SUMMARY OF THE INVENTION

Problems to be Solved by the Invention

To determine whether the transmitter information received by the portable device is that of the particular transmitter, the portable device stores the information on the particular transmitter. For example, the information on particular transmitters within an area where the portable device is likely to move is stored. However, for example, if the number of transmitters stored in the portable device is large, the processing efficiency of the portable device deteriorates, or the communication volume with the server increases. Thus, there is a real limitation to the number of transmitters that the portable device can store. Additionally, in the scheme such as iBeacon (registered trademark), the number of particular beacon transmitters is limited. As described above, there is a limit to the number of particular beacon transmitters that the portable device can handle.

The present invention has been made to solve the above problems, and it is an object of the present invention to increase the number of transmitters that the portable device can handle.

Means for Solving the Problems

The present invention is an information processing device characterized by including: a receive unit configured to receive first positional information related to a position of a portable device from the portable device via a network; an extraction unit configured to extract, based on second positional information related to a position of each of a plurality of registered transmitters and the first positional information, a predetermined number or less of transmitters from among the plurality of registered transmitters, the predetermined number being less than a number of the plurality of transmitters; and a transmit unit configured to transmit identification information of the predetermined number or less of transmitters to the portable device via the network, the identification information of the predetermined number or less of transmitters allowing the portable device to determine whether identification information indicating a transmitter transmitted from the transmitter is included in the identification information of the predetermined number or less of transmitters and to perform a particular process when the identification information indicating the transmitter is included in the identification information of the predetermined number or less of transmitters.

In the above configuration, a number of sets of identification information of transmitters that can be registered in the portable device may be limited, and the predetermined number may be a number to which the number of sets of identification information of transmitters is limited.

In the above configuration, the transmit unit may be configured to transmit only the identification information of the predetermined number or less of transmitters among the identification information of the predetermined number or less of transmitters and the second positional information to the portable device.

In the above configuration, the extraction unit may be configured to: extract transmitters of which second positional coordinates are located within a certain area including a first positional coordinate from among the plurality of registered transmitters, the first positional coordinate being a positional coordinate of the portable device based on the first positional information, the second positional coordinates being respective positional coordinates of the plurality of transmitters, calculate distances between transmitters located within the certain area and the portable device based the second positional coordinates corresponding to the transmitters located within the certain area and the first positional coordinate, and extract the predetermined number or less of transmitters based on the calculated distances from among the transmitters located within the certain area.

In the above configuration, the extraction unit may be configured to extract the predetermine number or less of transmitters with shorter distances from among the transmitters located within the certain area.

In the above configuration, the extraction unit may be configured to: when a number of transmitters located within the certain area is equal to or greater than a first threshold value, narrow the certain area and extract the transmitters located within the certain area, and when the number of transmitters located within the certain area is equal to or less than a second threshold value, expand the certain area and extract the transmitters located within the certain area.

In the above configuration, the transmitter may be a beacon transmitter that transmits beacon information including the identification information indicating the transmitter.

The present invention is an information processing device characterized by including: a receive unit configured to receive first positional information related to a position of a portable device from the portable device via a network; an extraction unit configured to: extract transmitters of which second positional coordinates are located within a certain area including a first positional coordinate from among a plurality of registered transmitters, the first positional coordinate being a positional coordinate of the portable device based on the first positional information, the second positional coordinates being respective positional coordinates of the plurality of transmitters, calculate distances between transmitters located within the certain area and the portable device based on the second positional coordinates corresponding to the transmitters located within the certain area and the first positional coordinate, and extract a predetermined number or less of transmitters with shorter distances from among the transmitters located within the certain area, the predetermined number being less than a number of the plurality of transmitters; and a transmit unit configured to transmit identification information of the predetermined number of transmitters to the portable device via the network, the identification information of the predetermined number or less of transmitters allowing the portable device to perform a particular process when identification information indicating a transmitter transmitted from the transmitter is included in the identification information of the predetermined number or less of transmitters, wherein a number of sets of identification information of transmitters that can be registered in the portable device is limited, and the predetermined number is a number to which the number of sets of identification information of transmitters is limited.

The present invention is a portable device characterized by including: a transmit unit configured to transmit first positional information related to a position of the portable device to an information processing device via a network; a first receive unit configured to receive identification information of a predetermined number or less of transmitters extracted, based on second positional information related to positions of a plurality of transmitters registered in the information processing device and the first positional information, from the plurality of transmitters registered, from the information processing device via the network, the predetermined number being less than a number of the plurality of transmitters; a second receive unit configured to receive identification information that is transmitted from a transmitter and indicates the transmitter; and a processing unit configured to determine whether the identification information indicating the transmitter is included in the identification information of the predetermined number or less of transmitters and perform a particular process when the identification information indicating the transmitter is included in the identification information of the predetermined number or less of transmitters.

The present invention is a system characterized by including: a portable device; and an information processing device, wherein the portable device transmits first positional information related to a position of the portable device to the information processing device via a network, the information processing device extracts a predetermined number or less of transmitters from a plurality of registered transmitters based on second positional information related to respective positions of the plurality of registered transmitters and the first positional information, the predetermined number being less than a number of the plurality of transmitters, and the portable device receives identification information that is transmitted from a transmitter and indicates the transmitter, determines whether the identification information indicating the transmitter is included in the identification information of the predetermined number or less of transmitters, and perform a particular process when the identification information indicating the transmitter is included in the identification information of the predetermined number or less of transmitters.

Effects of the Invention

The present invention can increase the number of transmitters handled by a portable device.

BRIEF DESCRIPTION OF THE DRAWINGS

FIG. 2 is a sequence diagram of the system of the embodiment;

FIG. 9A illustrates an example of information on transmitters stored in a database, FIG. 9B illustrates an example of a narrowed-down list, FIG. 9C illustrates examples of distances, and FIG. 9D illustrates an example of a transmitter list.

MODES FOR CARRYING OUT THE INVENTION

Hereinafter, a description will be given of an embodiment of the present invention with reference to the accompanying drawings.

Embodiment

Figure 1:
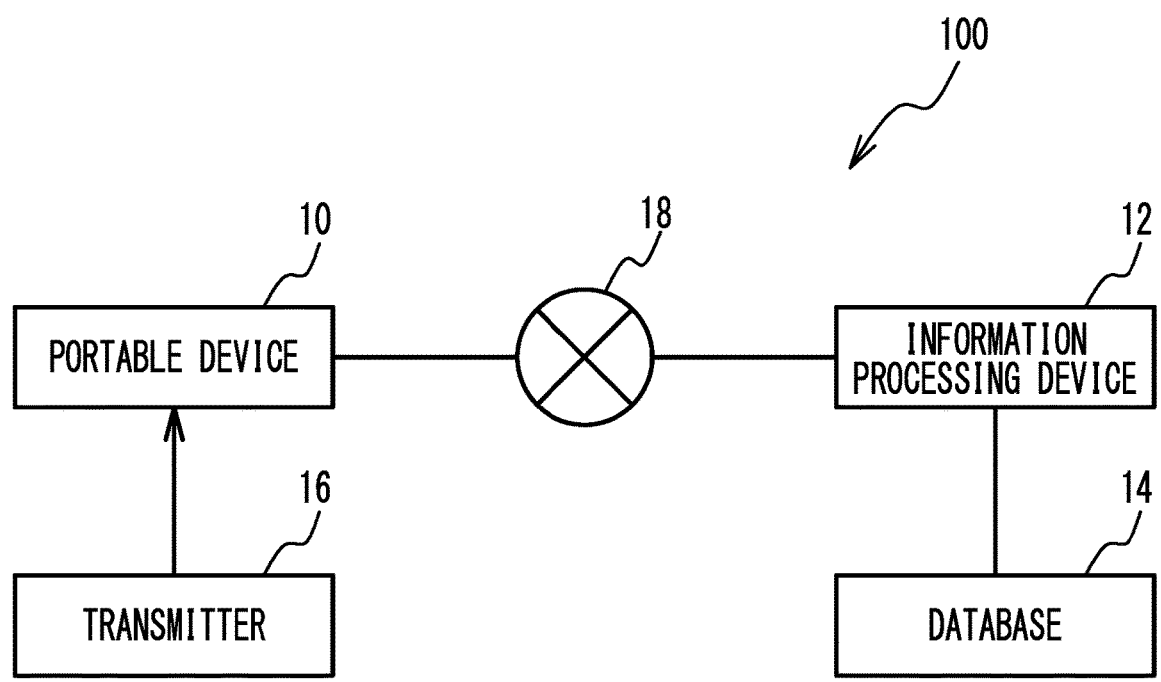
FIG. 1 is a block diagram of a system in accordance with an embodiment.

FIG. 1 is a block diagram of a system in accordance with an embodiment. A system 100 includes a portable device 10, an information processing device 12, a database 14, and a transmitter 16. The portable device 10 is, for example, a smartphone or a mobile phone. The information processing device 12 is a computer such as, for example, a personal computer or a server. The database 14 stores information on a plurality of the transmitters 16 registered in the information processing device 12. The database 14 may be a storage device such as a hard disk unit in the information processing device 12. The transmitter 16 transmits beacon information including the identification information (ID: Identification) of the transmitter 16. The transmitter 16 is a beacon transmitter of, for example, the iBeacon (registered trademark) method. The portable device 10 is coupled to the information processing device 12 via, for example, a network 18 such as the Internet. The network 18 includes a wireless network and/or a wired network.

FIG. 2 is a sequence diagram of the system of the embodiment. When the timing for the portable device to update a transmitter list has come as in step S20 in FIG. 5 described later, the portable device generates first positional information as in step S22. Thereafter, as illustrated in FIG. 2, the portable device 10 requests the transmitter list from the information processing device 12 (step S10). At this time, the portable device 10 transmits the first positional information related to the position of the portable device 10 and area information together with the request for the transmitter list to the information processing device 12. The information processing device 12 obtains second positional information related to the positions of registered transmitters and the identification information of the transmitters from the database 14, based on the first positional information and the area information obtained from the portable device 10 (step S12). The information processing device 12 generates the transmitter list, update interval information, and the area information based on the first positional information obtained from the portable device 10 and the second positional information obtained from the database (step S14). The information processing device 12 transmits the transmitter list, the update interval information, and the area information to the portable device 10 (step S16).

When coming close to the transmitter 16, the portable device 10 receives transmitter information including a transmitter ID from the transmitter 16 (step S18). The portable device 10 performs a particular process when the transmitter ID received from the transmitter 16 is included in the transmitter list (step S19). Thereafter, steps S10 through S16 are repeated. Accordingly, when the portable device 10 moves, the transmitter list according to the position of the portable device 10 is updated. Step S10 thereafter may be executed before step S19.

As described above, when the portable device 10 requests the transmitter list from the information processing device 12, the information processing device 12 generates the transmitter list based on the position of the portable device 10, and transmits the generated transmitter list to the portable device 10. This process allows the portable device 10 to change the transmitter list according to the position of the portable device 10. Even when there is a limitation to the number of transmitters (or groups of transmitters) that the portable device 10 can register in the transmitter list, the transmitter list can be appropriately updated according to the position of the portable device 10.

As the particular process, for example, the portable device 10 obtains the position of the transmitter 16 that has transmitted the transmitter information, from the server connected to the network 18. This allows the portable device 10 to find the position of the portable device 10 even when the portable device 10 cannot receive GPS signals and/or signals from a base station. Alternatively, when the portable device 10 comes close to a registered particular store, the portable device 10 may request a visiting point from the server of the store. Furthermore, when the portable device 10 comes close to a particular store, the portable device 10 may provide information on the store to the user. As described above, the particular process is a process executed only when the transmitter ID received from the transmitter 16 is included in the transmitter list, and not executed in other cases.

Figure 3A:
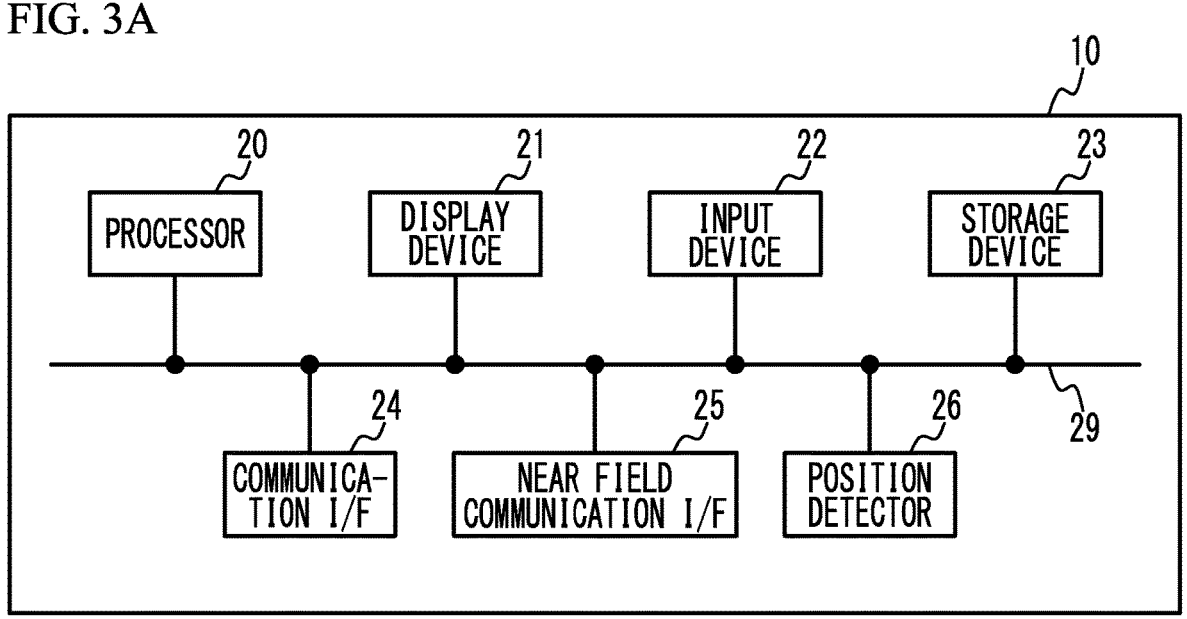
FIG. 3A is a block diagram of a portable device in accordance with the embodiment.

Next, a tangible process of the system in accordance with the embodiment will be described. First, hardware configurations of the portable device 10 and the information processing device 12 will be described. FIG. 3A is a block diagram of the portable device in accordance with the embodiment, and FIG. 3B is a block diagram of the information processing device of the embodiment.

As illustrated in FIG. 3A, the portable device 10 includes a processor 20, a display device 21, an input device 22, a storage device 23, a communication interface (I/F) 24, a near field communication interface (I/F) 25, a position detector 26, and an internal bus 29. The processor 20 is, for example, a CPU (Central Processing Unit). The processor 20 executes a program such as, for example, an application program. The display device 21 is, for example, a liquid crystal panel or an organic electroluminescent panel. The input device 22 is, for example a touch panel or a button. The storage device 23 is, for example, a volatile memory such as a Random Access Memory (RAM) or a nonvolatile memory such as a flash memory. The storage device 23 stores, for example, programs and data.

The communication interface 24 is a communication unit communicating with, for example a base station. The communication interface 24 transmits and receives information to and from the information processing device 12 via the network 18. The near field communication interface 25 is a communication unit for the near field communication method such as Bluetooth (registered trademark) Low Energy. The near field communication interface 25 receives the transmitter information transmitted from the transmitter 16. The position detector 26 obtains information on the latitude and the longitude of the portable device 10 with use of, for example, GPS (Global Positioning System). The internal bus 29 interconnects the units.

Figure 3B:
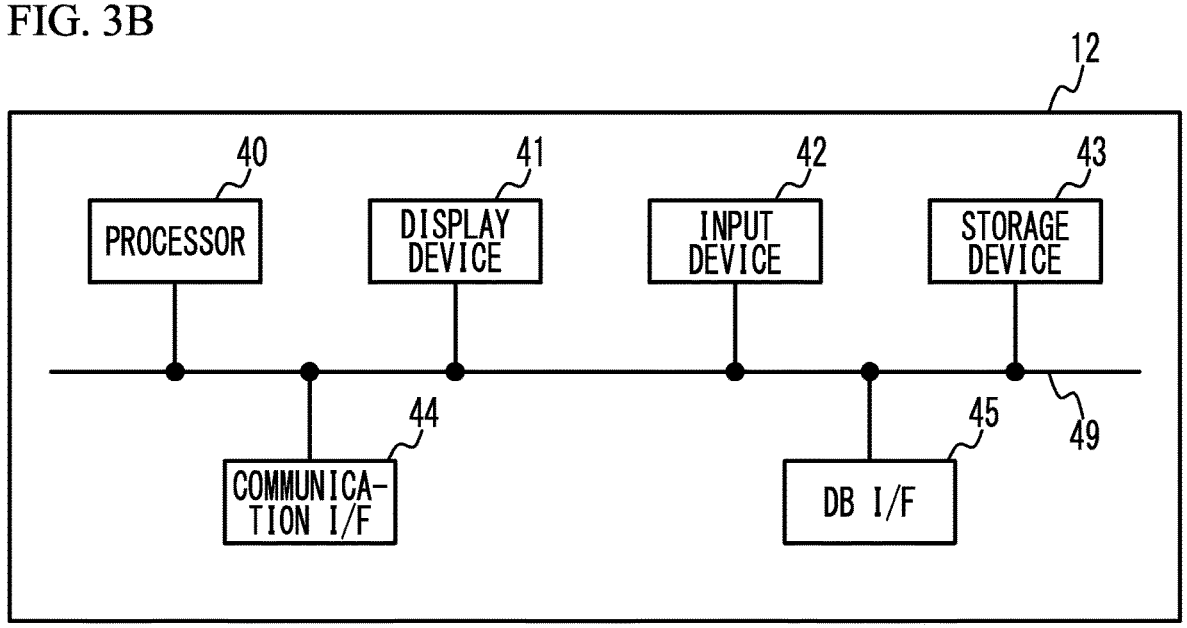
FIG. 3B is a block diagram of an information processing device of the embodiment.

As illustrated in FIG. 3B, the information processing device 12 includes a processor 40, a display device 41, an input device 42, a storage device 43, a communication interface 44, a database (DB) interface 45, and an internal bus 49. The processor 20 is, for example, a CPU. The processor 40 executes a program. The display device 41 is, for example, a liquid crystal panel or an organic electroluminescent panel. The input device 42 is, for example, a keyboard or a mouse. The storage device 43 is, for example, a volatile memory such as a RAM or a nonvolatile memory such as a flash memory or a hard disk unit. The storage device 43 stores, for example, programs and data. The communication interface 44 is a communication unit communicating with, for example, the network 18. The communication interface 44 transmits and receives information to and from the portable device 10 via the network 18. The DB interface 45 is a unit transmitting and receiving information to and from the database 14. The internal bus 49 interconnects the units.

Figure 4:
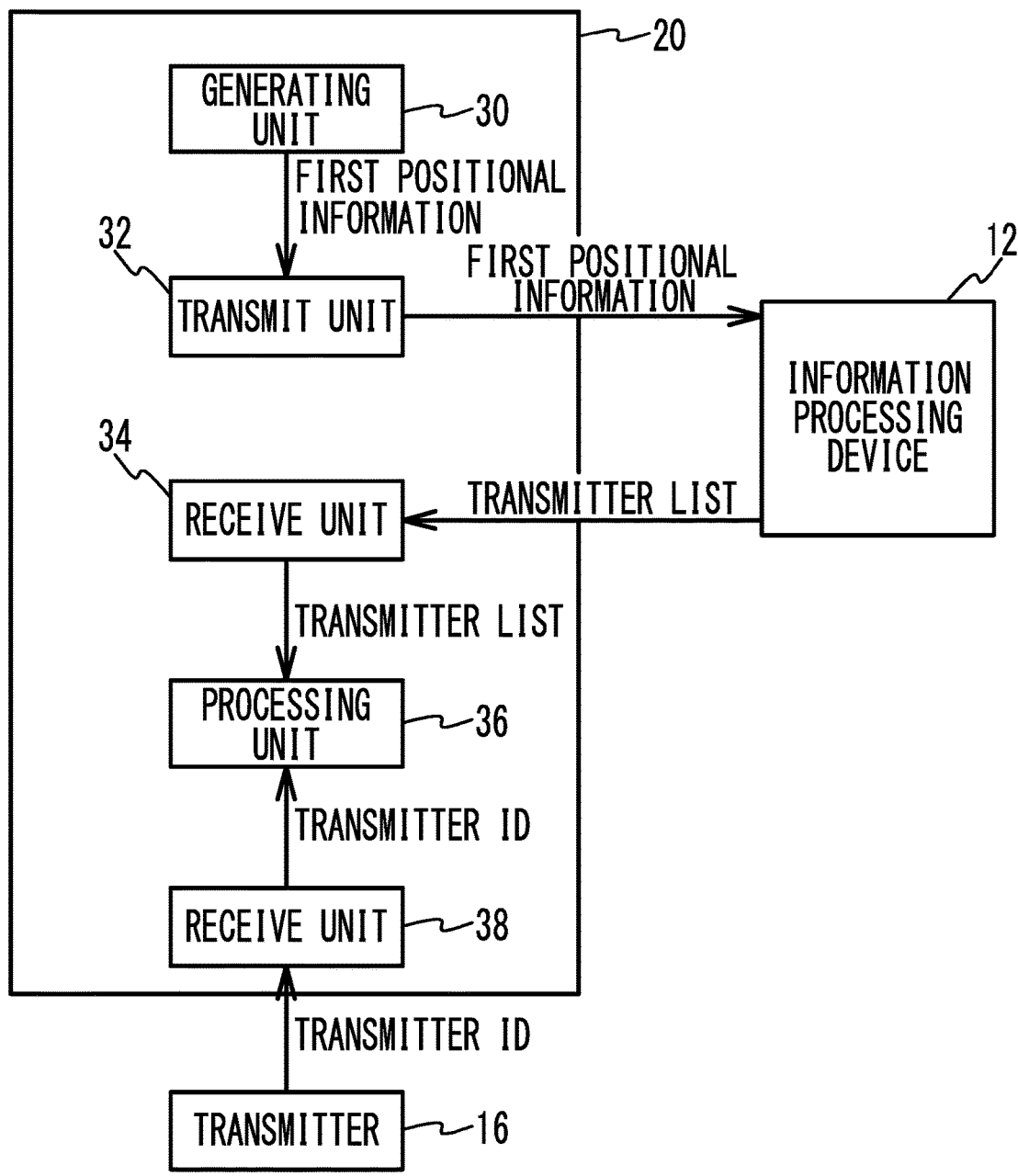
FIG. 4 is a functional block diagram of the portable device in accordance with the embodiment.
Figure 5:
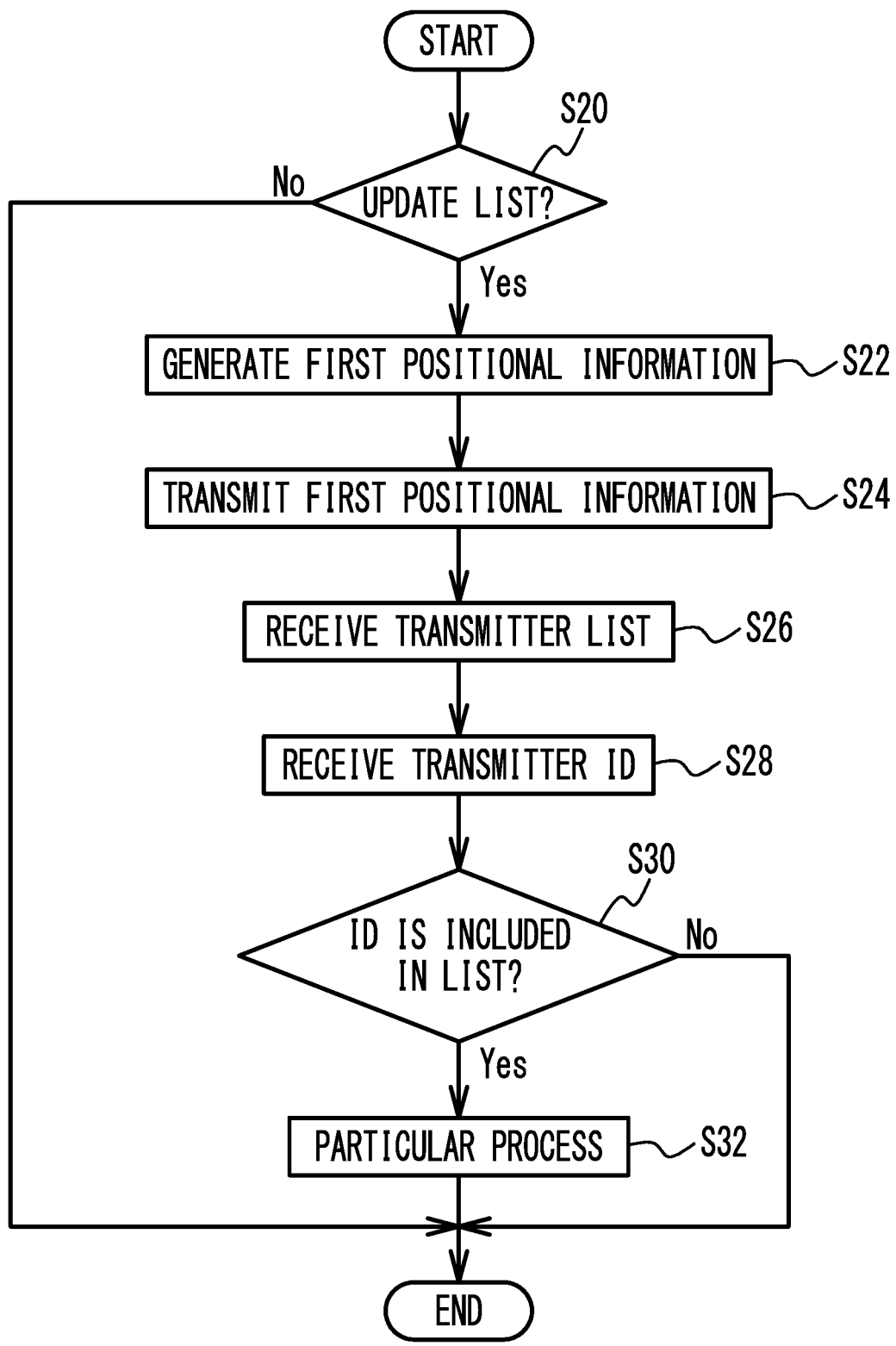
FIG. 5 is a flowchart of a process executed by the processor of the portable device in the embodiment.

Next, a process executed by the portable device 10 will be described. FIG. 4 is a functional block diagram of the portable device in accordance with the embodiment. FIG. 5 is a flowchart of the process executed by the processor of the portable device in the embodiment. As illustrated in FIG. 4, the processor 20 of the portable device 10 cooperates with a program to function as a generating unit 30, a transmit unit 32, a receive unit 34, a processing unit 36, and a receive unit 38.

As illustrated in FIG. 4 and FIG. 5, the processor 20 of the portable device 10 determines whether to update the transmitter list (step S20). For example, when a predetermined time period or more has elapsed since the last updating of the transmitter list and the first positional information related to the portable device 10 has been updated, the determination becomes Yes. In other cases, the determination becomes No. The predetermined time period may be an update interval included in the update interval information obtained from the information processing device 12 when the transmitter list was updated last time. The case where the first positional information related to the portable device 10 has been updated is the case where the portable device 10 has handed over a base station or where the transmitter information on the particular transmitter has been received. When the determination is No, the process is ended, and other processes are executed.

When the determination is Yes, the generating unit 30 generates the first positional information related to the position of the portable device 10 (step S22). The generating unit 30 sets the information on the latitude and the longitude obtained by the position detector 26 as the first positional information. Alternatively, the generating unit 30 may set the transmitter ID received by the receive unit 38 as the first positional information. Yet alternatively, the generating unit 30 may set the information related to the base station being communicating with the communication interface 24 (e.g., the identification information of the base station) as the first positional information.

At step S10 in FIG. 2, the transmit unit 32 transmits the first positional information to the information processing device 12 (step S24). For example, the transmit unit 32 transmits the first positional information to the information processing device 12 through the communication interface 24. At this time, the transmit unit 32 may transmit, to the information processing device 12, the area information obtained from the information processing device 12 when the transmitter list was updated last time. Then, the processor 20 stands by, or executes other processes.

At step S16 in FIG. 2, the receive unit 34 receives the transmitter list from the information processing device 12 (step S26). For example, the receive unit 34 receives the transmitter list from the information processing device 12 through the communication interface 24. The receive unit 34 may receive the update interval information and the area information from the information processing device 12. The processes at steps S20 through S26 may be executed in parallel to other processes executed by the processor 20. Thereafter, the processor 20 stands by, or executes other processes.

While the processor 20 stands by, or executes other processes, at step S18 in FIG. 2, the receive unit 38 receives the transmitter information including the transmitter ID transmitted from the transmitter 16 (step S28). For example, the receive unit 38 receives the transmitter information including the transmitter ID through the near field communication interface 25.

At step S19 in FIG. 2, the processing unit 36 determines whether the transmitter list includes the transmitter ID (step S30). When the determination is No, the process is ended. When the determination is Yes, the processing unit 36 executes the particular process (step S32). Then, the process is ended.

Figure 6:
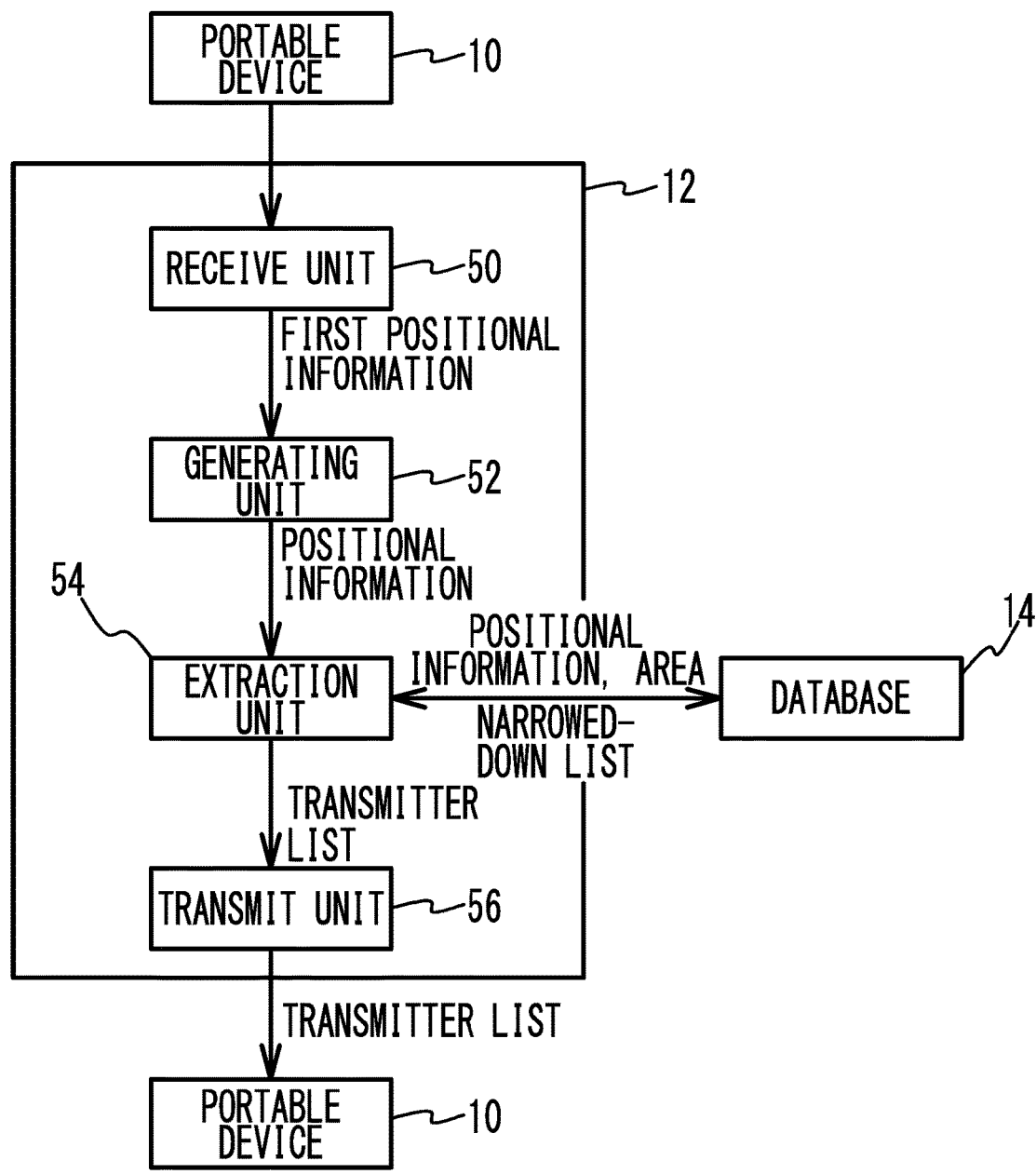
FIG. 6 is a functional block diagram of the information processing device in accordance with the embodiment.
Figure 7:
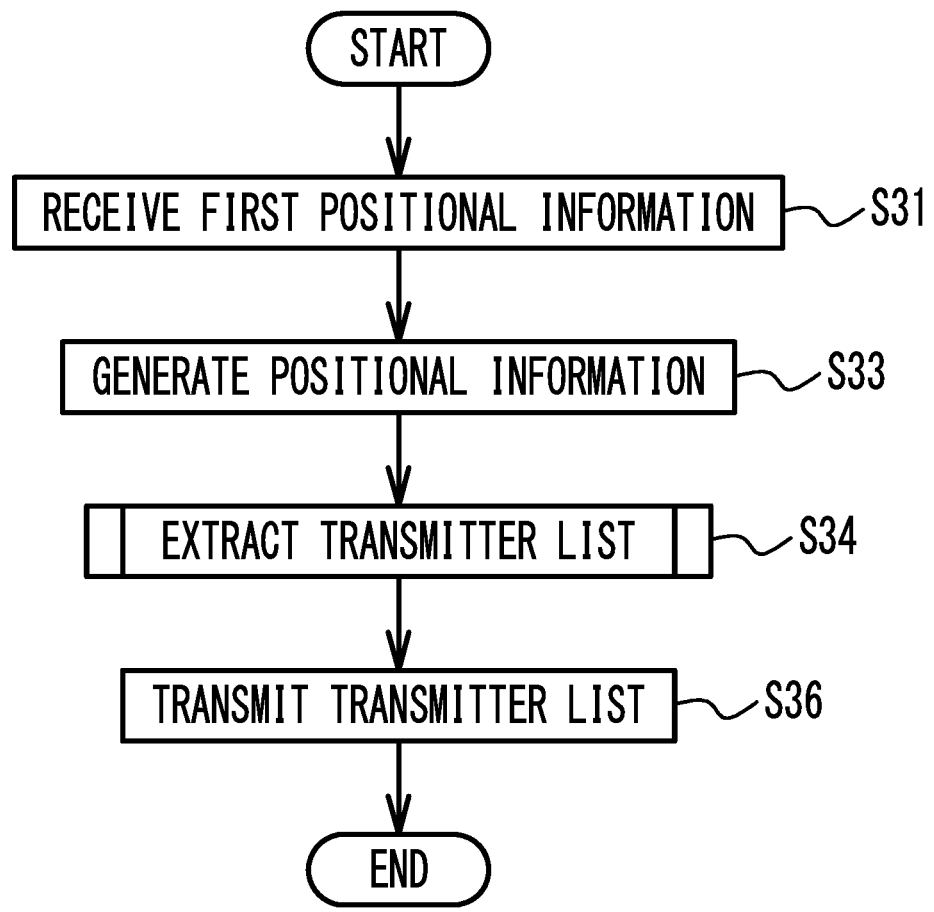
FIG. 7 is a flowchart of a process executed by the processor of the information processing device in the embodiment.

Next, a process executed by the information processing device 12 will be described. FIG. 6 is a functional block diagram of the information processing device in accordance with the embodiment. FIG. 7 is a flowchart of the process executed by the processor of the information processing device of the embodiment. As illustrated in FIG. 6, the processor 40 of the information processing device 12 cooperates with a program to function as a receive unit 50, a generating unit 52, an extraction unit 54, and a transmit unit 56.

As illustrated in FIG. 6 and FIG. 7, at step S10 in FIG. 2, the receive unit 50 receives the first positional information from the portable device 10 (step S31). For example, the receive unit 50 receives the first positional information from the portable device 10 through the communication interface 44. The receive unit 50 may receive the area information from the portable device 10.

The generating unit 52 generates, from the first positional information, positional information indicating the position of the portable device (step S33). For example, when the first positional information is the information on the latitude and the longitude of the portable device 10, the generating unit 52 sets the first positional information as the positional information. When the first positional information is the transmitter ID, the generating unit 52 obtains information indicating the installed position of the transmitter identified by the transmitter ID from the database 14, and sets it as the positional information. When the first positional information is information related to the base station, the generating unit 52 obtains the installed position of the base station, and sets it as the positional information.

At step S14 in FIG. 2, the extraction unit 54 extracts the transmitter list from the positional information indicating the position of the portable device 10 and the second positional information related to the positions of the registered transmitters stored in the database 14 (step S34). The detailed example will be described later. The extraction unit 54 may generate the update interval information and the area information.

At step S16 in FIG. 2, the transmit unit 56 transmits the transmitter list to the portable device 10 (step S36). For example, the transmit unit 56 transmits the transmitter list to the portable device 10 through the communication interface 44. The transmit unit 56 may transmit the update interval information and the area information to the portable device 10. Thereafter, the process is ended.

Figure 8:
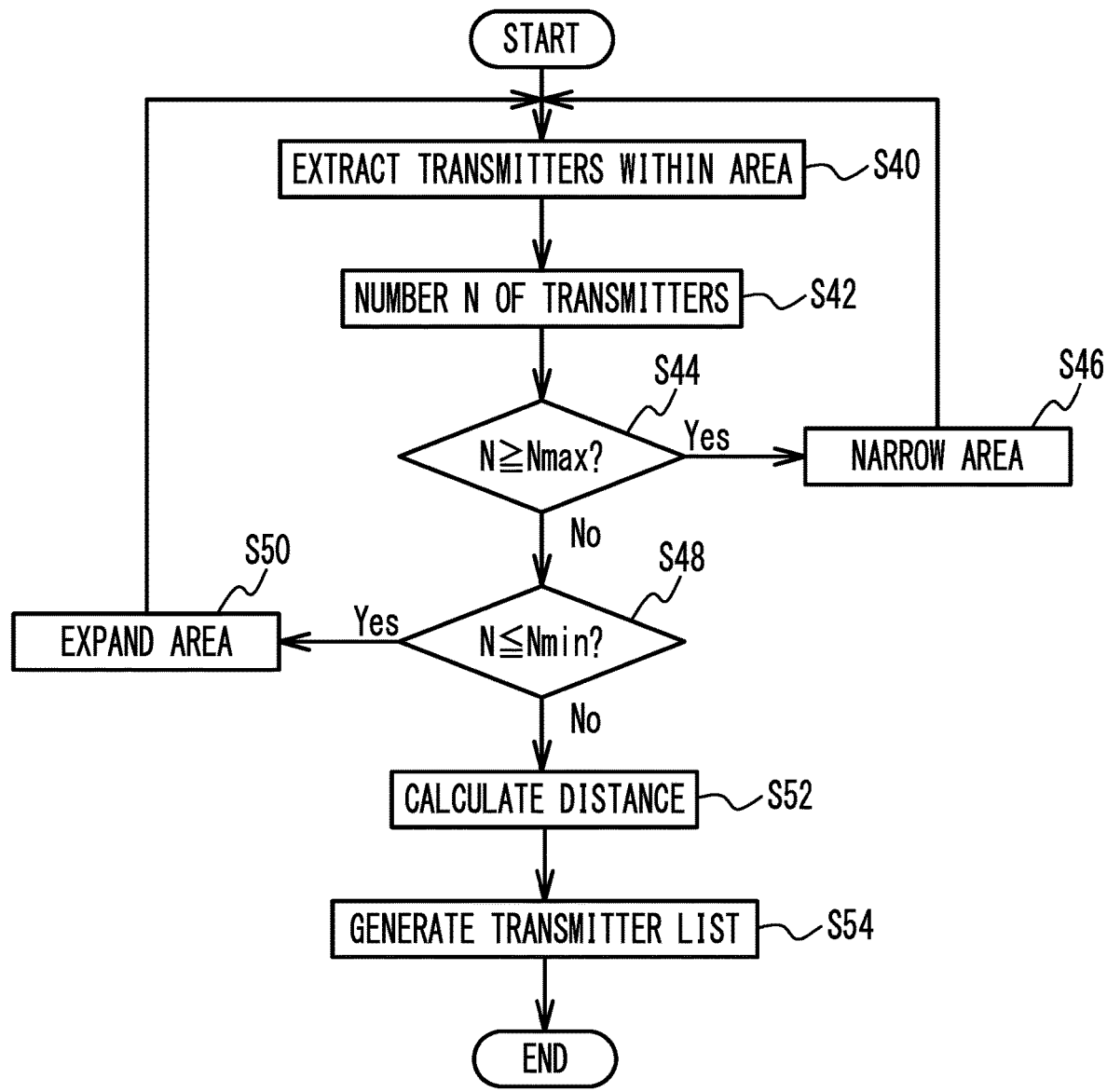
FIG. 8 is a flowchart of a process executed by the processor of the information processing device at step S34 in FIG. 7.
Figure 10A:
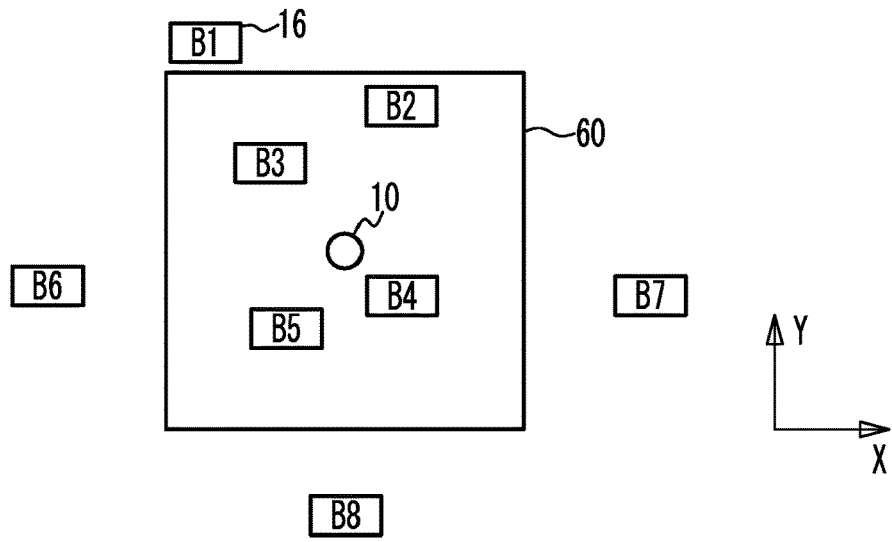
FIG. 10A through FIG. 10C illustrate positions of transmitters and the portable device on the ground.
Figure 10B:
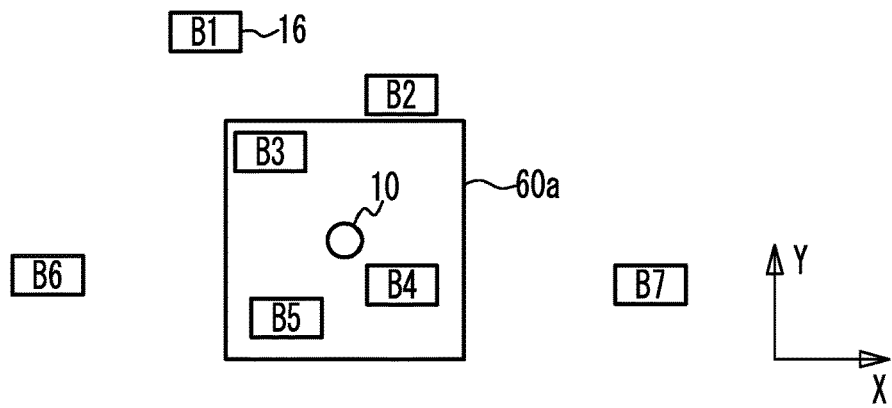
Figure 10C:
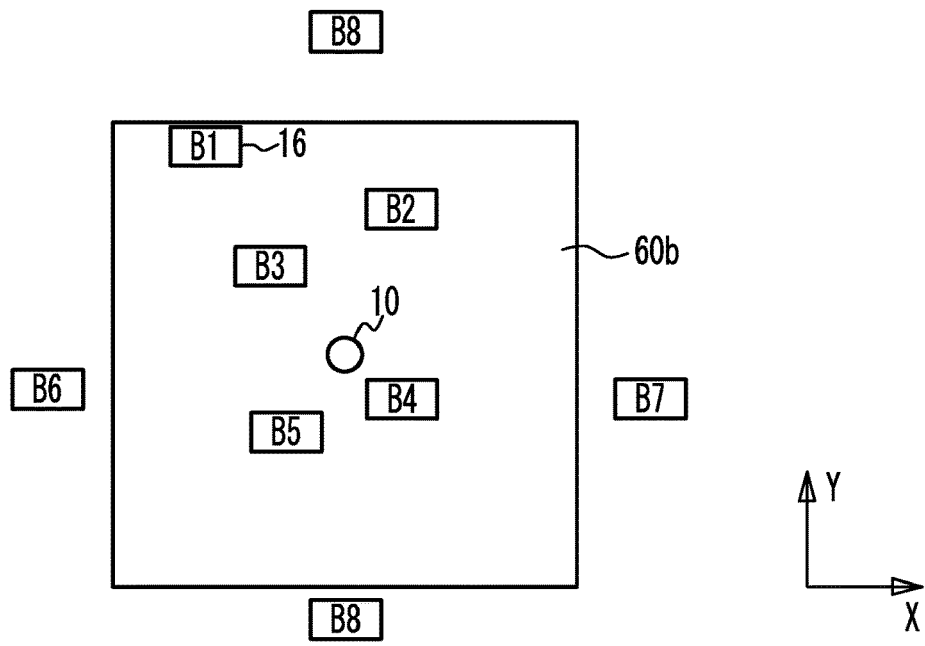

Then, the example of step S34 in FIG. 7 will be described. FIG. 8 is a flowchart of the process executed by the processor of the information processing device at step S34 of FIG. 7. FIG. 9A illustrates an example of information on transmitters stored in the database, FIG. 9B illustrates an example of a narrowed-down list, FIG. 9C illustrates examples of distances, and FIG. 9D illustrates an example of the transmitter list. FIG. 10A through FIG. 10C illustrate the positions of the transmitters and the portable device on the ground. The number of transmitters stored in the database is, for example, 10000 or greater, the number of transmitters in the narrowed-down list is 20 or greater, and the number of transmitters in the transmitter list is 20. In the following description, for simplification, the description will be given with reduced numbers.

As illustrated in FIG. 9A, the database 14 stores the respective X coordinates X1 through X8 and the respective Y coordinates Y1 through Y8 of registered transmitters B1 through B8 in association with the transmitter IDs. As illustrated in FIG. 10A, the transmitters B1 through B8 are installed. The positions of the transmitters B1 through B8 in FIG. 10A correspond to the X coordinates and the Y coordinates in FIG. 9A. The X coordinate is, for example latitude, and the Y coordinate is, for example, longitude.

In FIG. 8, the extraction unit 54 extracts the transmitters within an area 60 (step S40). As illustrated in FIG. 10A, the area 60 is the area having X coordinates and Y coordinates within a constant range. For example, the area is set within 500 m in the ±X direction and 500 m in the ±Y direction around the position of the portable device 10. For example, the extraction unit 54 transmits the area 60 and the positional information of the portable device 10 to the database 14. The database 14 extracts the transmitters having X coordinates and Y coordinates within a certain area including the positional information (the X coordinate and the Y coordinate) of the portable device 10, and transmits the extracted transmitters as the narrowed-down list to the extraction unit 54. As illustrated in FIG. 10A, the transmitters within the area 60 are B2 through B5. Thus, the narrowed-down list includes the transmitter ID, the X coordinate, and the Y coordinate of each of the transmitters B2 through B5 as illustrated in FIG. 9B.

In FIG. 8, the extraction unit 54 calculates the number N of transmitters in the narrowed-down list (step S42). For example, in the examples of FIG. 9B and FIG. 10A, the number N is four. The extraction unit 54 determines whether the number N is equal to or greater than a first threshold value Nmax (step S44). When the determination is Yes, the extraction unit 54 narrows the area (step S46). For example, an area 60a is set within 400 m in the X direction and 400 m in the Y direction around the position of the portable device 10. As illustrated in FIG. 10B, the transmitters within the area 60a become B3 through B5. Thus, the transmitters in the narrowed-down list become B3 through B5. Thereafter, the process returns to step S40.

When the determination at step S44 is No, the extraction unit 54 determines whether the number N is equal to or less than a second threshold value Nmin (step S48). When the determination is Yes, the extraction unit 54 expands the area (step S50). For example, an area 60b is set within 600 m in the X direction and 600 m in the Y direction around the position of the portable device 10. As illustrated in FIG. 10C, the transmitters within the area 60b become B1 through B5. Therefore, the transmitters in the narrowed-down list become B1 through B5. Thereafter, the process returns to step S40.

When the determination is No at step S48, the extraction unit 54 calculates the distances between the portable device 10 and the transmitters in the narrowed-down list (step S52). For example, in FIG. 10A, the respective distances L2 through L5 between the portable device 10 and the transmitters B2 through B5 are calculated. The calculation results become the distances L2 through L5 with respect to the transmitter B2 through B5 as illustrated in FIG. 9C, respectively. The transmitters B2 through B5 are sorted in ascending order of distance. The ascending order becomes the order of the distances L4, L5, L3, and L2.

The extraction unit 54 generates the transmitter list based on the calculated distances (step S54). As illustrated in FIG. 9D, when the number of transmitters listed in the transmitter list is three, the extraction unit 54 generates the transmitter list including the transmitter IDs of three transmitters B4, B5, and B3 with shorter distances in FIG. 9C. The extraction unit 54 may generate the area 60 for which the narrowed-down list has been generated as the area information. The extraction unit 54 may generate the update interval information according to the density of transmitters. For example, when the density of transmitters is high, the update interval is made to be short, and when the density of transmitters is low, the update interval is made to be long.

The number of transmitters registered in the database 14 may be 10000 or greater or 100000 or greater. It is impossible for the portable device 10 to store the transmitter IDs of all of these transmitters. For example, as the number of transmitters stored in the portable device 10 increases, the processing efficiency deteriorates because the portable device 10 needs to handle a large amount of processes. In addition, the communication volume with the information processing device 12 increases. Furthermore, depending on the portable device 10, there may be a limitation to the number of transmitter IDs that can be registered. For example, the number is 20 in the case of iOS.

In the embodiment, as in step S24 in FIG. 5 and step S31 in FIG. 7, the receive unit 50 of the information processing device 12 receives the first positional information transmitted by the transmit unit 32 of the portable device 10 via a network. As in step S34 in FIG. 7, the extraction unit 54 of the information processing device 12 extracts as the transmitter list a predetermined number or less of transmitters from a plurality of registered transmitters based on the first positional information. As in step S36 in FIG. 7 and step S26 in FIG. 5, the transmit unit 56 of the information processing device 12 transmits the transmitter list to the receive unit 34 (a first receive unit) of the portable device 10 via the network.

As in step S28 in FIG. 5, the receive unit 38 (a second receive unit) of the portable device 10 receives the beacon information transmitted from the transmitter 16. As in step S32, the processing unit 36 of the portable device 10 performs a particular process based on the transmitter ID indicating the transmitter 16 transmitted from the transmitter 16. For example, the processing unit 36 of the portable device 10 executes a particular process when the received transmitter ID is included in the transmitter list.

This configuration allows the portable device 10 to obtain the transmitter list of transmitters extracted based on the position of the portable device 10. Therefore, even when the portable device 10 moves, the transmitter list can be appropriately updated. Therefore, the number of transmitter IDs stored in the portable device 10 can be reduced.

The extraction unit 54 of the information processing device 12 extracts a predetermined number or less of transmitters from a plurality of transmitters based on the first positional information and a plurality of sets of second positional information related to respective positions of registered transmitters as the transmitter list. This configuration enables to appropriately generate the transmitter list.

Furthermore, to allow the extraction unit 54 to extract the appropriate transmitter list, it is sufficient if the transmitters close to the portable device 10 are extracted. However, calculation of all the distances between the transmitters registered in the database 14 and the portable device 10 needs tremendous time.

Thus, in the embodiment, as in step S40 in FIG. 8, in FIG. 9B, and in FIG. 10A, the extraction unit 54 extracts the transmitters B4, B5, and B3 located within the certain area 60 to which the portable device 10 belongs from among the transmitters B1 through B8. As in step S52 in FIG. 8 and in FIG. 9C, the extraction unit 54 calculates the distances between the transmitters B2 through B5 located within the certain area 60 and the portable device 10 based on the second positional information corresponding to the transmitters B2 through B5 located within the certain area 60 and the first positional information. As in step S54 in FIG. 8 and in FIG. 9D, based on the calculation results, the predetermined number or less of the transmitters B3 through B5 are extracted from the transmitters located within the certain area 60.

Accordingly, it is sufficient if the distances between the transmitters within the certain area 60 including the portable device 10 and the portable device 10 are calculated among the registered transmitters. Thus, the time to calculate the distances between the transmitters and the portable device 10 can be reduced. The number of transmitters within the certain area 60 is preferably equal to or greater than the predetermined number.

Furthermore, as illustrated in FIG. 9A, the second positional information includes respective coordinates X1 through X8 and Y1 through Y8 of the transmitters B1 through B8. As in step S40 in FIG. 8 and in FIG. 9B and FIG. 10A, the extraction unit 54 extracts the transmitters B2 through B5 of which the positional coordinates are within the certain area 60 from among the transmitters B1 through B8. As in step S52 and in FIG. 9C, the extraction unit 54 calculates the distances L2 through L5 based on the positional coordinates of the transmitters B2 through B5 located within the certain area 60, respectively. As illustrated in FIG. 9D, the extraction unit 54 extracts the predetermined number (three) or less of the transmitters B4, B5, and B3 with shorter distances of the distances L2 through L5 among the transmitters B2 through B5 located within the certain area 60.

As described above, the positional coordinates corresponding to the transmitter are stored in the database 14. The transmitters within the certain area can be easily extracted by extracting the transmitters of which the positional coordinates are within the certain area including the positional coordinates of the portable device 10. The positional coordinates may be coordinates indicating angles such as latitude and longitude. The positional coordinates may be coordinates indicating distances in the X direction and the Y direction. It is sufficient if the positional coordinates are the coordinates indicating the positions of the portable device 10 and the transmitter.

If the certain area 60 is too large, the number of transmitters of which the distances are to be calculated becomes large, and the time to calculate the distances becomes long. If the certain area 60 is too small, a sufficient number of transmitters are not extracted.

Thus, as in steps S44 and S46 in FIG. 8 and as in FIG. 10B, the extraction unit 54 narrows the certain area when the number N of the transmitters located within the certain area 60 is equal to or greater than the first threshold value Nmax, and extracts the transmitter B3 through B5 located within the certain area 60a. On the other hand, when the number N of transmitters located within the certain area 60 is equal to or less than the second threshold value Nmin, the certain area 60 is expanded, and the transmitters B1 through B5 located within the certain area 60b are extracted. Accordingly, the number of transmitters of which the distances are to be calculated is appropriately controlled. Here, the first threshold value Nmax>the second threshold value Nmin. The first threshold value Nmax is set to be greater than the number of transmitters in the transmitter list and to the extent that the calculation time of the distance can be reduced. The second threshold value Nmin is set to be equal to or slightly greater than the number of transmitters in the transmitter list. At step S36 in FIG. 7, the transmit unit 56 of the information processing device 12 transmits, to the portable device 10, the area information indicating the certain area for which the transmitter list was extracted together with the transmitter list. The portable device 10 holds the area information. At step S24 in FIG. 5, the transmit unit 32 of the portable device 10 transmits the area information together with the first positional information to the information processing device 12. This configuration allows the extraction unit 54 to generate the transmitter list with use of the certain area used when the transmitter list was generated last time. The portable device 10 is likely to be located near the position at which the portable device 10 received the transmitter list last time. Thus, by using the previous certain area as an initial value, the transmitter list can be generated faster.

At step S36 in FIG. 7, the transmit unit 56 of the information processing device 12 transmits the update interval information together with the transmitter list to the portable device 10. As in step S20 in FIG. 5, the portable device 10 transmits the first positional information to the information processing device 12 after the period of the update interval indicated by the update interval information has elapsed. When the extraction unit 54 generates the transmitter list, the extraction unit 54 generates the update interval information according to the density of transmitters. For example, when the density of transmitters is low, the update interval is set to be long, and when the density of transmitters is high, the update interval is set to be short. This configuration enables to adjust the interval at which the transmitter list is updated according to the density of transmitters.

The transmitter 16 is a beacon transmitter transmitting the beacon information including the transmitter ID indicating the transmitter. The transmitter 16 may have a transmit function and a receive function. The transmitter 16 transmits the transmitter ID with use of, for example, near field communication, but may not necessarily have a receive function. For example, the transmitter 16 is a beacon transmitter of iBeacon (registered trademark) or the like. In iBeacon (registered trademark), the transmitter ID includes a UU (Universally Unique) ID, a measure value, and a minor value. The transmitter ID in the transmitter list may include the UUID, the measure value, and the minor value, but may include only the UUID, or only the UUID and the measure value. As described above, the transmitter ID in the transmitter list may not necessarily be in a unit of transmitter, may be a group of transmitters. The program causing the processor 20 of the portable device 10 to function as the transmit unit 32, the receive units 34 and 38, and the processing unit 36 may be an application program installed in the portable device 10 or may be a component of a part of the application program. The transmitter may be a fixed transmitter, or a movable transmitter.

While the exemplary embodiments of the present invention have been illustrated in detail, the present invention is not limited to the above-mentioned embodiments, and other embodiments, variations and variations may be made without departing from the scope of the present invention.

The invention claimed is:

1. An information processing device comprising:
 a memory; and
 a processor coupled to the memory and configured to:
  receive first positional information related to a position of a portable device from the portable device via a network;
  extract first transmitters, a first coordinate of a second positional coordinate of each of the first transmitters being located within a first certain range including a first coordinate of a first positional coordinate, a second coordinate of the second positional coordinate of each of the first transmitters being located within a second certain range including a second coordinate of a first positional coordinate from among a plurality of registered transmitters, the first positional coordinate being a positional coordinate of the portable device based on the first positional information, the second positional coordinate being a corresponding positional coordinate of each of the plurality of registered transmitters, calculate respective distances between the first transmitters located within the first certain range and within the second certain range and the portable device in a coordinate system of the first coordinate and the second coordinate based on the second positional coordinate corresponding to each of the first transmitters located within the first certain range and within the second certain range and the first positional coordinate after the first transmitters are extracted, and extract a predetermined number or less of second transmitters based on the calculated distances from among the first transmitters located within the first certain range and within the second certain range; and transmit identification information of the predetermined number or less of second transmitters to the portable device via the network, the identification information of the predetermined number or less of second transmitters allowing the portable device to determine whether identification information indicating a transmitter transmitted from the transmitter is included in the identification information of the predetermined number or less of second transmitters and to perform a particular process when the identification information indicating the transmitter is included in the identification information of the predetermined number or less of second transmitters.

2. The information processing device according to claim 1, wherein
a number of sets of identification information of transmitters that can be registered in the portable device is limited, and
the predetermined number is a number to which the number of sets of identification information of transmitters is limited.

3. The information processing device according to claim 1, wherein
the processor is configured to transmit only the identification information of the predetermined number or less of second transmitters among the identification information of the predetermined number or less of second transmitters and the second positional coordinates to the portable device.

4. The information processing device according to claim 1, wherein
the processor is configured to extract the predetermined number or less of second transmitters with shorter distances from among the first transmitters located within the first certain range and within the second certain range.

5. The information processing device according to claim 1, wherein
the processor is configured to:
when a number of transmitters located within the first certain range and within the second certain range is equal to or greater than a first threshold value, narrow the first certain range and the second certain range and extract the first transmitters located within the first certain range and within the second certain range, and
when the number of transmitters located within the first certain range and within the second certain range is equal to or less than a second threshold value, expand the first certain range and the second certain range and extract the first transmitters located within the first certain range and within the second certain range.

6. The information processing device according to claim 1, wherein
the transmitter is a beacon transmitter that transmits beacon information including the identification information indicating the transmitter.

7. The information processing device according to claim 1, wherein
the first coordinate of the first positional coordinate is corresponding to an X coordinate on a ground, the second coordinate of the first positional coordinate is corresponding to a Y coordinate on the ground, the first coordinate of the second positional coordinate is corresponding to an X coordinate on the ground, the second coordinate of the second positional coordinate is corresponding to a Y coordinate on the ground.

8. The information processing device according to claim 1, wherein
the first coordinate of the first positional coordinate is corresponding to latitude, the second coordinate of the first positional coordinate is corresponding to longitude, the first coordinate of the second positional coordinate is corresponding to latitude, the second coordinate of the second positional coordinate is corresponding to longitude.

9. The information processing device according to claim 1, wherein
the processor is configured to receive identification information of the first transmitters located within the first certain range and within the second certain range from a database storing first coordinates and second coordinates in associate with identification information of the plurality of registered transmitters.

10. A portable device comprising:
a memory; and
a processor coupled to the memory and configured to:
transmit first positional information related to a position of the portable device to an information processing device via a network;
receive identification information of a predetermined number or less of first transmitters from the information processing device via the network, the identification information obtained by extracting second transmitters, a first coordinate of a second positional coordinate of each of the second transmitters being located within a first certain range including a first coordinate of a first positional coordinate and a second coordinate of the second positional coordinate of each of the second transmitters being located within a second certain range including a second coordinate of a first positional coordinate from among a plurality of transmitters registered in the information processing device, the first positional coordinate being a positional coordinate of the portable device based on the first positional information, the second positional coordinate being positional coordinate of each of the plurality of transmitters registered, calculating respective distances between the second transmitters located within the first certain range and within the second certain range and the portable device in a coordinate system of the first coordinate and the second coordinate based on the second positional coordinate corresponding to each of the second transmitters located within the first certain range and within the second certain range and the first positional coordinate after extracting the second transmitters, and extracting the identification information of the predetermined number or less of the first transmitters based on the calculated distances among the second transmitters located within the first certain range and within the second certain range, the predetermined number being less than a number of the plurality of transmitters registered;
receive identification information that is transmitted from a transmitter and indicates the transmitter; and
determine whether the identification information indicating the transmitter is included in the identification information of the predetermined number or less of first transmitters and perform a particular process when the identification information indicating the transmitter is included in the identification information of the predetermined number or less of first transmitters.

11. A system comprising:
a portable device; and
an information processing device, wherein
the portable device transmits first positional information related to a position of the portable device to the information processing device via a network,
the information processing device extracts first transmitters, a first coordinate of a second positional coordinate of each of the first transmitters being located within a first certain range including a first coordinate of a first positional coordinate and a second coordinate of the second positional coordinate of each of the first transmitters being located within a second certain range including a second coordinate of a first positional coordinate from among a plurality of registered transmitters, the first positional coordinate being a positional coordinate of the portable device based on the first positional information, the second positional coordinate being a corresponding positional coordinate of each of the plurality of registered transmitters, calculates respective distances between the first transmitters located within the first certain range and within the second certain range and the portable device in a coordinate system of the first coordinate and the second coordinate based on the second positional coordinate corresponding to each of the first transmitters located within the first certain range and within the second certain range and the first positional coordinate after the first transmitters are extracted, and extracts a predetermined number or less of second transmitters based on the calculated distances from among the first transmitters located within the first certain range and within the second certain range, and
the portable device receives identification information that is transmitted from a transmitter and indicates the transmitter, determines whether the identification information indicating the transmitter is included in the identification information of the predetermined number or less of second transmitters, and perform a particular process when the identification information indicating the transmitter is included in the identification information of the predetermined number or less of second transmitters.

12. A method implemented by a computer, the method comprising:
receiving first positional information related to a position of a portable device from the portable device via a network;
extracting first transmitters, a first coordinate of a second positional coordinate of each of the first transmitters being located within a first certain range including a first coordinate of a first positional coordinate and a second coordinate of the second positional coordinate of each of the first transmitters being located within a second certain range including a second coordinate of a first positional coordinate from among a plurality of registered transmitters, the first positional coordinate being a positional coordinate of the portable device based on the first positional information, the second positional coordinate being a corresponding positional coordinate of each of the plurality of registered transmitters, calculating respective distances between the first transmitters located within the first certain range and within the second certain range and the portable device in a coordinate system of the first coordinate and the second coordinate based on the second positional coordinate corresponding to each of the first transmitters located within the first certain range and within the second certain range and the first positional coordinate after extracting the first transmitters, and extracting a predetermined number or less of second transmitters based on the calculated distances from among the first transmitters located within the first certain range and within the second certain range, the predetermined number being less than a number of the plurality of registered transmitters; and
transmitting identification information of the predetermined number or less of transmitters to the portable device via the network, the identification information of the predetermined number or less of second transmitters allowing the portable device to determine whether identification information indicating a transmitter transmitted from the transmitter is included in the identification information of the predetermined number or less of second transmitters and to perform a particular process when the identification information indicating the transmitter is included in the identification information of the predetermined number or less of second transmitters.

13. A method executed by a portable device, the method comprising:
transmitting first positional information related to a position of the portable device to an information processing device via a network;
receiving identification information of a predetermined number or less of first transmitters from the information processing device via the network, the identification information obtained by extracting second transmitters, a first coordinate of a second positional coordinate of each of the second transmitters being located within a first certain range including a first coordinate of a first positional coordinate and a second coordinate of the second positional coordinate of each of the second transmitters being located within a second certain range including a second coordinate of a first positional coordinate from among a plurality of transmitters registered in the information processing device, the first positional coordinate being a positional coordinate of the portable device based on the first positional information, the second positional coordinate being positional coordinate of each of the plurality of transmitters registered, calculating respective distances between the second transmitters located within the first certain range and within the second certain range and the portable device in a coordinate system of the first coordinate and the second coordinate based on the second positional coordinate corresponding to each of the second transmitters located within the first certain range and within the second certain range and the first positional coordinate after extracting the second transmitters, and extracting the identification information of the predetermined number or less of the first transmitters based on the calculated distances among the second transmitters located within the first certain range and within the second certain range, the predetermined number being less than a number of the plurality of transmitters registered;

receiving identification information that is transmitted from a transmitter and indicates the transmitter; and determining whether the identification information indicating the transmitter is included in the identification information of the predetermined number or less of first transmitters and performing a particular process when the identification information indicating the transmitter is included in the identification information of the predetermined number or less of first transmitters.

* * * * *